(12) United States Patent
Sasagawa et al.

(10) Patent No.: US 9,071,767 B2
(45) Date of Patent: Jun. 30, 2015

(54) OMNIDIRECTIONAL CAMERA

(75) Inventors: Jun Sasagawa, Tokyo-to (JP); Hirokazu Yamada, Tokyo-to (JP)

(73) Assignee: Kabushiki Kaisha TOPCON, Tokyo-to (JP)

( * ) Notice: Subject to any disclaimer, the term of this patent is extended or adjusted under 35 U.S.C. 154(b) by 581 days.

(21) Appl. No.: 13/426,659

(22) Filed: Mar. 22, 2012

(65) Prior Publication Data
US 2012/0242785 A1    Sep. 27, 2012

(30) Foreign Application Priority Data

| Mar. 24, 2011 | (JP) | ................................. 2011-066186 |
| Mar. 24, 2011 | (JP) | ................................. 2011-066187 |
| Apr. 4, 2011 | (JP) | ................................. 2011-082755 |

(51) Int. Cl.
| H04N 5/225 | (2006.01) |
| H04N 7/00 | (2011.01) |
| H01H 47/00 | (2006.01) |
| H05K 5/00 | (2006.01) |
| H05K 9/00 | (2006.01) |
| H04N 5/247 | (2006.01) |
| G03B 11/04 | (2006.01) |
| H04N 7/18 | (2006.01) |
| G03B 17/00 | (2006.01) |
| H04N 5/232 | (2006.01) |

(52) U.S. Cl.
CPC ................ *H04N 5/247* (2013.01); *G03B 11/04* (2013.01); *H04N 5/23238* (2013.01); *H04N 7/181* (2013.01); *G03B 17/00* (2013.01); *H04N 5/2251* (2013.01)

(58) Field of Classification Search
None
See application file for complete search history.

(56) References Cited

U.S. PATENT DOCUMENTS

| 4,320,949 A | 3/1982 | Pagano |
| 4,769,711 A | 9/1988 | Date |
| 5,041,719 A | 8/1991 | Harris et al. |

(Continued)

FOREIGN PATENT DOCUMENTS

| DE | 60105068 T2 | 12/2004 |
| EP | 1368703 B1 | 8/2004 |

(Continued)

OTHER PUBLICATIONS

Canadian communication dated Apr. 3, 2014 in co-pending Canadian patent application No. 2,772,210.

(Continued)

*Primary Examiner* — Christopher S Kelley
*Assistant Examiner* — Rebecca Volentine
(74) *Attorney, Agent, or Firm* — Nields, Lemack & Frame, LLC

(57) ABSTRACT

An omnidirectional camera comprises a camera mounting frame 5 of a cylindrical hollow body, two or more first mount blocks 8 which hold a first lens unit 9 in a horizontal posture and are installed to the camera mounting frame from a horizontal direction, and first circuit boards provided on inner end surfaces of the first mount blocks, and in the omnidirectional camera, the camera mounting frame and the first mount blocks are made of materials with good heat transfer properties, the first circuit board has a ground layer formed on an abutting surface with respect to the first mount block and a first image pickup element arranged on an optical axis of the first lens unit, and the heat generated from the first image pickup element is radiated from the first mount block and the camera mounting frame through the ground layer.

8 Claims, 5 Drawing Sheets

(56) References Cited

U.S. PATENT DOCUMENTS

| | | |
|---|---|---|
| 5,130,794 A | 7/1992 | Ritchey |
| 6,141,034 A | 10/2000 | McCutchen |
| 6,201,574 B1 | 3/2001 | Martin |
| 6,354,749 B1 | 3/2002 | Pfaffenberger, II |
| 7,043,280 B1 | 5/2006 | Shields et al. |
| 7,366,553 B1 | 4/2008 | Shields et al. |
| 7,391,298 B1 | 6/2008 | Campbell et al. |
| 7,552,025 B2 | 6/2009 | Ohtomo et al. |
| 7,627,235 B2 | 12/2009 | McCutchen et al. |
| 7,773,121 B1 | 8/2010 | Huntsberger et al. |
| 8,228,364 B2 | 7/2012 | Cilia |
| 8,885,016 B2 | 11/2014 | Sasagawa et al. |
| 2003/0093805 A1* | 5/2003 | Gin .................. 725/105 |
| 2004/0048507 A1 | 3/2004 | Hage |
| 2004/0151492 A1 | 8/2004 | Blok et al. |
| 2005/0030392 A1 | 2/2005 | Lee et al. |
| 2006/0075450 A1 | 4/2006 | Haas et al. |
| 2006/0125921 A1* | 6/2006 | Foote .................. 348/159 |
| 2006/0132602 A1 | 6/2006 | Muto et al. |
| 2007/0181555 A1 | 8/2007 | Clough et al. |
| 2007/0217782 A1 | 9/2007 | McCutchen et al. |
| 2008/0055409 A1 | 3/2008 | Mars et al. |
| 2009/0082629 A1 | 3/2009 | Dotan et al. |
| 2009/0112389 A1 | 4/2009 | Yamamoto et al. |
| 2009/0251530 A1 | 10/2009 | Cilia |
| 2009/0323121 A1 | 12/2009 | Valkenburg et al. |
| 2010/0201203 A1 | 8/2010 | Schatz et al. |
| 2010/0270014 A1 | 10/2010 | Huang |
| 2011/0069148 A1* | 3/2011 | Jones et al. .................. 348/36 |
| 2012/0057852 A1 | 3/2012 | Devleeschouwer et al. |
| 2012/0169842 A1* | 7/2012 | Chuang et al. .................. 348/39 |
| 2012/0206565 A1* | 8/2012 | Villmer .................. 348/36 |
| 2012/0242786 A1 | 9/2012 | Sasagawa et al. |
| 2012/0242788 A1* | 9/2012 | Chuang et al. .................. 348/36 |
| 2012/0242837 A1 | 9/2012 | Sasagawa et al. |

FOREIGN PATENT DOCUMENTS

| | | |
|---|---|---|
| EP | 2306230 A1 | 4/2011 |
| JP | 2002-229138 A | 8/2002 |
| JP | 2002-341409 A | 11/2002 |
| JP | 2003-348394 A | 12/2003 |
| JP | 2004-61808 A | 2/2004 |
| JP | 2004-104632 A | 4/2004 |
| JP | 2004-328296 A | 11/2004 |
| JP | 2007-171048 A | 7/2007 |
| JP | 2011-41196 A | 2/2011 |
| WO | 2005/048586 A1 | 5/2005 |

OTHER PUBLICATIONS

Office Action mailed May 5, 2014 in co-pending U.S. Appl. No. 13/426,666.

German communication dated Sep. 18, 2013 in corresponding German patent application No. DE 10 2012 005 726.1.

German communication dated Sep. 18, 2013 in co-pending German patent application No. DE 10 2012 005 728.8.

German communication dated Sep. 18, 2013 in co-pending German patent application No. DE 10 2012 005 729.6.

IEEE Transactions on Robotics and Automation, vol. 16, No. 6, Dec. 2000, pp. 890-898, "Vision-based Navigation and Environmental Representations with an Omni-directional Camera", Gaspar, et al.

2007 IEEE International Conference on Robotics and Automation, Apr. 10-14, 2007, pp. 3945-3950, "Single View Point Omnidirectional Camera Calibration from Planar Grids", Mei, et al.

Proceedings of the World Congress on Engineering and Computer Science 2007, Oct. 24-26, 2007 (WCECS 2007), pp. 1-6, "Combined Convection and Radiation Heat Transfer from a Fin Array with a Vertical Base and Horizontal Fins", Rao, et al.

Office Action mailed Jun. 23, 2014 in co-pending U.S. Appl. No. 13/426,661.

Notice of Allowance mailed Sep. 10, 2014 in co-pending U.S. Appl. No. 13/426,666.

Notice of Allowance mailed Oct. 10, 2014 in co-pending U.S. Appl. No. 13/426,661.

Chinese communication, with English translation, mailed May 12, 2014 in corresponding Chinese patent application No. 201210079430.8.

* cited by examiner

OMNIDIRECTIONAL CAMERA

BACKGROUND OF THE INVENTION

The present invention relates to an omnidirectional camera which is provided with a plurality of cameras and which takes an, image of an omnidirectional view.

In recent years, with spread of a navigation system, not only a positional information as an information of an electronic map but also an image information of a target, buildings, a landscape around a road, and others is required. Therefore, the measurement for acquiring the positional data as the map information is carried out and, at the same time, the image data is acquired by an omnidirectional camera.

In recent years, increase of pixel and increase in a photographing speed of an image pickup element are attempted with increase in a resolution of an omnidirectional camera. On the other hand, the realization of high pixel involves the generation of high heat of the image pickup element, and the increase in the photographing speed involves the generation of high heat of an electronic component and an electronic circuit which process an image signal output from the image pickup element. In particular, since the omnidirectional camera integrally accommodates a plurality of cameras therein, the omnidirectional camera generates much heat, and further, heat sources are concentrated in a limited space, and hence effectively releasing the heat is an important problem.

Further, the omnidirectional camera is generally used in the field, a heat release state is largely affected by a use environment. In particular, the use at a high temperature and further under the direct sunlight is a harsh environment for the omnidirectional camera, and the omnidirectional camera may not normally operate due to a high temperature in some cases.

SUMMARY OF THE INVENTION

It is an object of the present invention to facilitate heat radiation from a heat generating component and enable a stable operation in a high-temperature environment.

To attain the above object, an omnidirectional camera according to the present invention comprises a camera mounting frame of a cylindrical hollow body, two or more first mount blocks which hold a first lens unit in a horizontal posture and are installed to the camera mounting frame from a horizontal direction, and first circuit boards provided on inner end surfaces of the first mount blocks, and in the omnidirectional camera, the camera mounting frame and the first mount blocks are made of materials with good heat transfer properties, the first circuit board has a ground layer formed on an abutting surface with respect to the first mount block and a first image pickup element arranged on an optical axis of the first lens unit, and the heat generated from the first image pickup element is radiated from the first mount block and the camera mounting frame through the ground layer.

Further, the omnidirectional camera according to the present invention further comprises a second mount block (14) which holds a second lens unit in a vertical posture and is installed so as to cover an upper end of the camera mounting frame, and a second circuit board provided on an inner end surface of the second mount block, and in the omnidirectional camera, the second mount block is made of a material with good heat transfer properties, the second circuit board has a ground layer formed on an abutting surface with respect to the second mount block and a second image pickup element arranged on an optical axis of the second lens unit, and the heat from the second image pickup element is radiated from the second mount block and the camera mounting frame through the ground layer.

Further, in the omnidirectional camera according to the present invention, a bottom case made of a material with good heat transfer properties is provided at a lower end of the camera mounting frame, an image processing integrated circuit is accommodated in the bottom case, the image processing integrated circuit is in contact with the bottom case through a heat transfer member, and the heat from the image processing integrated circuit is radiated from the bottom case through the heat transfer member.

Further, in the omnidirectional camera according to the present invention, a heat transfer portion is integrally provided to protrude from the bottom case, and the heat transfer member is provided between the heat transfer portion and the image processing integrated circuit.

Further, in the omnidirectional camera according to the present invention, the first lens unit and the second lens unit have a liquid-tight structure, the first mount blocks, the second mount block, and the bottom case are liquid-tightly installed to the camera mounting frame, and the first mount blocks, the second mount block, and the bottom case constitute a liquid-tight structure.

Further, in the omnidirectional camera according to the present invention, radiation fins are formed on at least one of the camera mounting frame and the second mount block.

Further, in the omnidirectional camera according to the present invention, the liquid-tight structure is accommodated in a heat shield cover with good ventilation.

Furthermore, in the omnidirectional camera according to the present invention, a heat insulating portion is provided between the heat shield cover and the camera mounting frame, and the heat shield cover and the camera mounting frame are thermally insulated from each other.

According to the present invention, the omnidirectional camera comprises a camera mounting frame of a cylindrical hollow body, two or more first mount blocks which hold a first lens unit in a horizontal posture and are installed to the camera mounting frame from a horizontal direction, and first circuit boards provided on inner end surfaces of the first mount blocks, and in the omnidirectional camera, the camera mounting frame and the first mount blocks are made of materials with good heat transfer properties, the first circuit board has a ground layer formed on an abutting surface with respect to the first mount block and a first image pickup element arranged on an optical axis of the first lens unit, and the heat generated from the first image pickup element is radiated from the first mount block and the camera mounting frame through the ground layer. As a result, the heat generated from the image pickup element accommodated inside is transferred to the first mount blocks and the camera mounting frame. Therefore, the heat is released effectively and the heat is not stored inside.

Further, according to the present invention, the omnidirectional camera further comprises a second mount block which holds a second lens unit in a vertical posture and is installed so as to cover an upper end of the camera mounting frame, and a second circuit board provided on an inner end surface of the second mount block, and in the omnidirectional camera, the second mount block is made of a material with good heat transfer properties, the second circuit board has a ground layer formed on an abutting surface with respect to the second mount block and a second image pickup element arranged on an optical axis of the second lens unit, and the heat from the second image pickup element is radiated from the second mount block and the camera mounting frame through the ground layer. As a result, the heat generated from the image pickup element accommodated inside is transferred to the second mount block and the camera mounting frame. Therefore, the heat is released effectively and the heat is not stored inside.

Further, according to the present invention, in the omnidirectional camera, a bottom case made of a material with good heat transfer properties is provided at a lower end of the camera mounting frame, an image processing integrated circuit is accommodated in the bottom case, the image processing integrated circuit is in contact with the bottom case through a heat transfer member, and the heat from the image processing integrated circuit is radiated from the bottom case through the heat transfer member. As a result, heat generated from the image processing integrated circuit can be effectively released without being stored inside.

Further, according to the present invention, in the omnidirectional camera, a heat transfer portion is integrally provided to protrude from the bottom case, and the heat transfer member is provided between the heat transfer portion and the image processing integrated circuit. As a result, the heat generated from the image processing integrated circuit can be effectively transmitted to the bottom case.

Further, according to the present invention, in the omnidirectional camera, the first lens unit and the second lens unit have a liquid-tight structure, the first mount blocks, the second mount block, and the bottom case are liquid-tightly installed to the camera mounting frame, and the first mount blocks, the second mount block, and the bottom case constitute a liquid-tight structure. As a result, a liquid-tight container that accommodates the first lens unit, the second lens unit, and others and a cover are not required, thus enabling the miniaturization.

Further, according to the present invention, in the omnidirectional camera, radiation fins are formed on at least one of the camera mounting frame and the second mount block. As a result, the heat transferred to the first mount blocks, the second mount block, and the camera mounting frame can be effectively radiated.

Further, according to the present invention, in the omnidirectional camera, the liquid-tight structure is accommodated in a heat shield cover with good ventilation. As a result, the direct sunlight is blocked by the heat shield cover, and a stable operation can be obtained even under the direct sunlight in the field.

Furthermore, according to the present invention, in the omnidirectional camera, a heat insulating portion is provided between the heat shield cover and the camera mounting frame, and the heat shield cover and the camera mounting frame are thermally insulated from each other. As a result, the heat of the direct sunlight is not transferred from the heat shield cover to the camera mounting frame, and a stable operation can be obtained.

DETAILED DESCRIPTION OF THE PREFERRED EMBODIMENTS

Description will be given on embodiments of the present invention by referring to the attached drawings.

Figure 1:
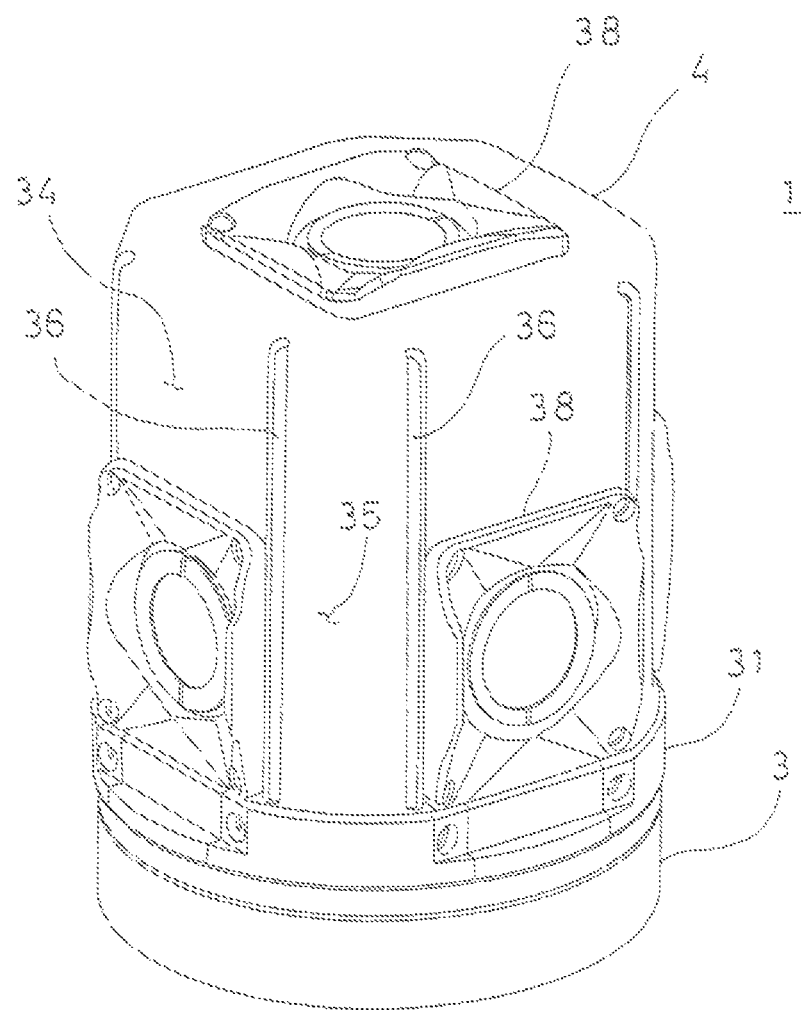
FIG. 1 is a perspective view of an omnidirectional camera according to an embodiment of the present invention.
Figure 2:
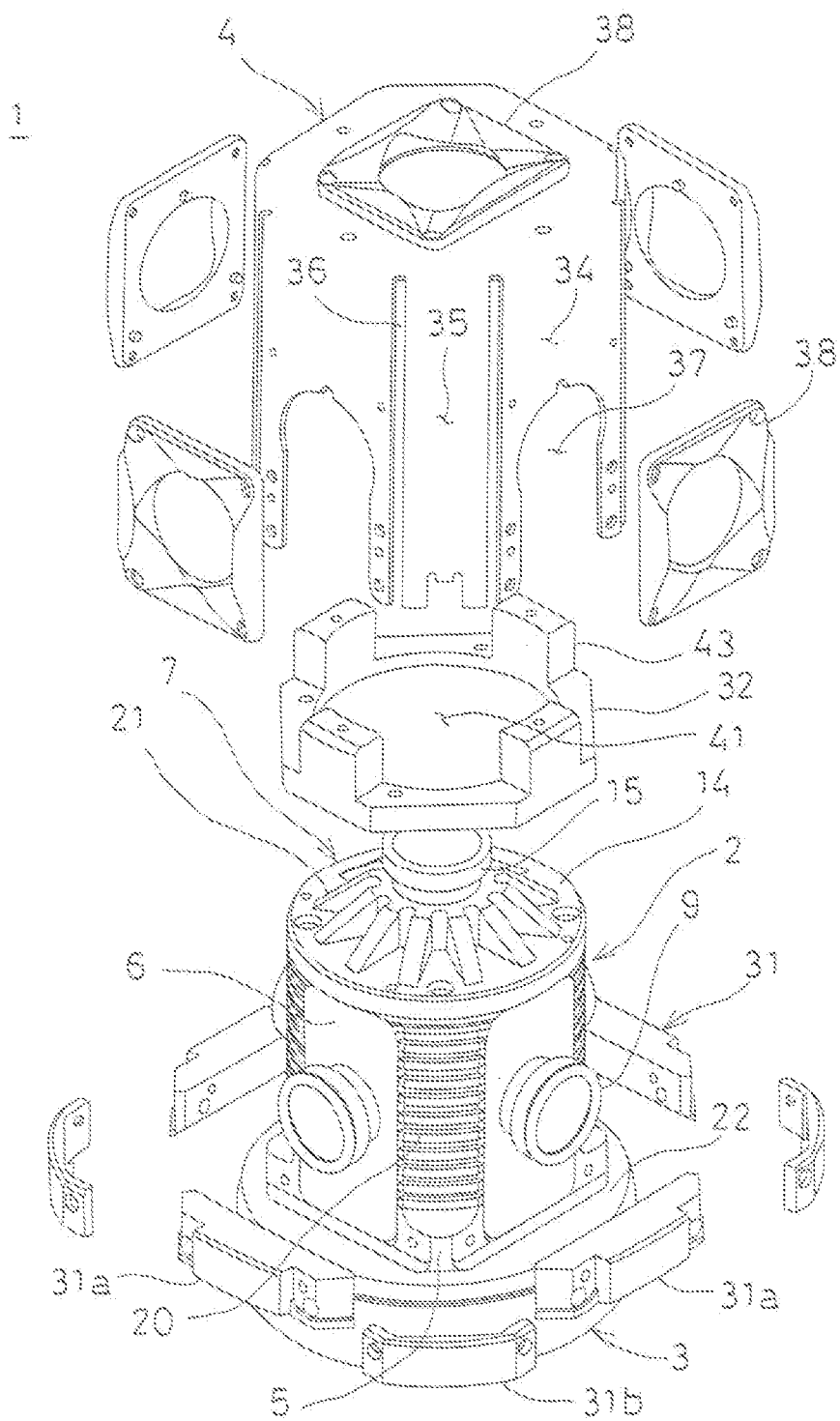
FIG. 2 is an exploded perspective view of the omnidirectional camera.

FIG. 1 and FIG. 2 show appearance of an omnidirectional camera 1 according to an embodiment of the present invention.

The omnidirectional camera 1 mainly includes a camera assembly 2, an image processing unit 3 accommodating an image processing integrated circuit, an electronic circuit, and others, and a heat shield cover 4 with good ventilation.

The camera assembly 2 has a camera mounting frame 5 made of a metal material with good heat transfer properties such as aluminum or copper or the like, the camera mounting frame 5 is a cylindrical hollow body having a circular cross section, and four horizontal camera units 6 and a vertical camera unit 7 are provided in the camera mounting frame 5. A total of four horizontal camera units 6 are present on a horizontal plane orthogonal to a center line of the camera mounting frame 5, and each two-unit is arranged respectively on two center lines perpendicular to each other. An optical axis of the horizontal camera units 6 is parallel to or coincides with the center lines. Further, the vertical camera unit 7 is arranged at an upper end of the camera mounting frame 5 so as to coincide with the center line of the camera mounting frame 5. An optical axis of the vertical camera unit 7 coincides with the center line of the camera mounting frame 5 and is vertical. It is to be noted that the camera mounting frame 5 may be a cylindrical hollow body having a polygonal cross section.

Figure 3:
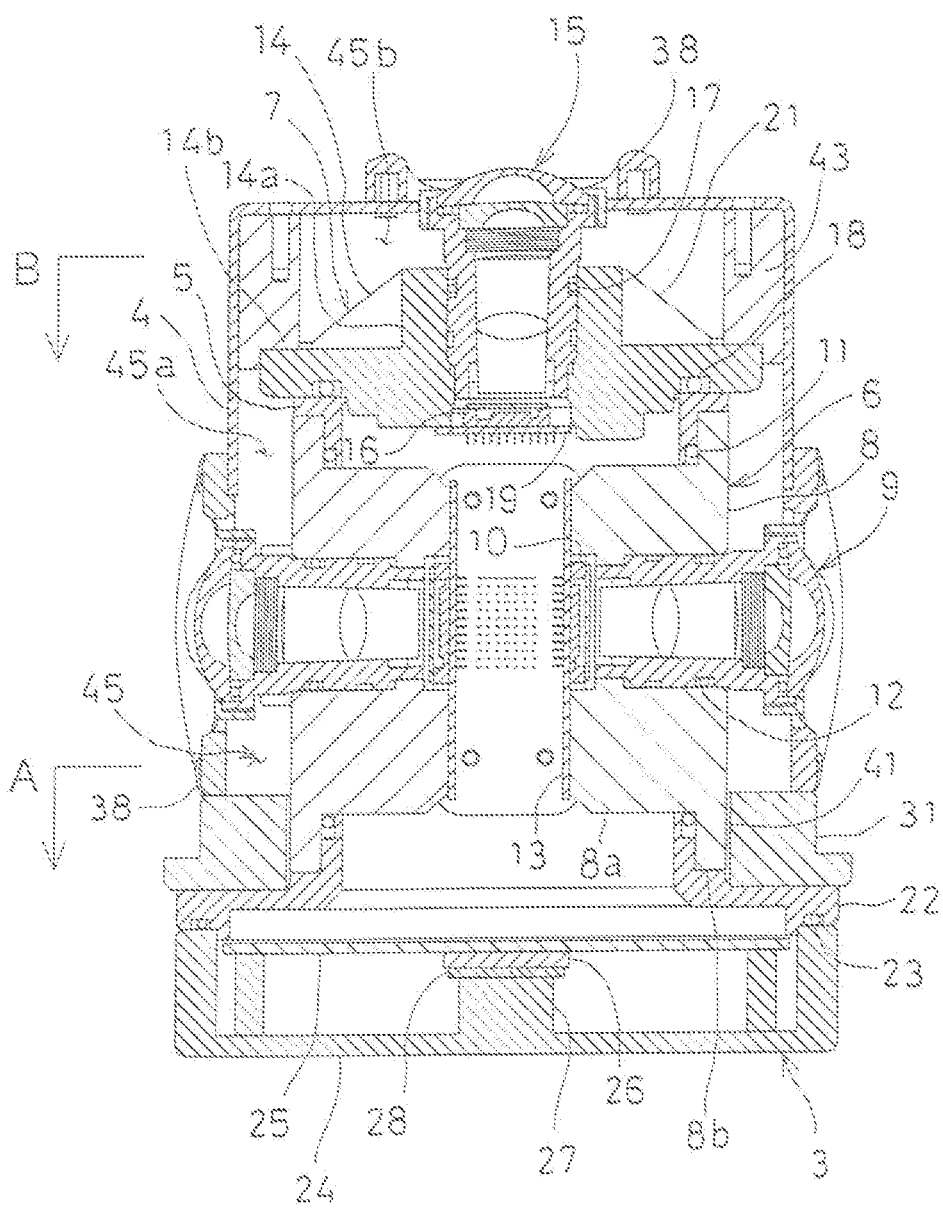
FIG. 3 is a sectional elevational view of the omnidirectional camera.

The horizontal camera unit 6 comprises a first mount block 8, a first lens unit 9 inserted into the first mount block 8 from the outside in the radial direction, and a first image pickup element 10 (see FIG. 3) arranged at a focal position of the first lens unit 9, and the first mount block 8 is made of a material with good heat transfer properties, e.g., a metal material such as aluminum or copper or the like.

Heat radiation fins 20 are formed in a horizontal direction at portions of the camera mounting frame 5 where the horizontal camera units 6 are not installed, and the heat radiation fins 20 are provided at a predetermined pitch in a vertical direction.

The first mount block 8 has a block portion 8a protruding toward the central side and a flange portion 8b bulging around the block portion 8a. The first mount block 8 is inserted from the outside in such a manner that the block portion 8a penetrates the camera mounting frame 5. The flange portion 8b and the camera mounting frame 5 are closely fitted to each other through a metallic contact, and the flange portion 8b is fixed to the camera mounting frame 5 by a securing means such as a bolt or the like. A seal ring 11 is interposed between the flange portion 8b and the camera mounting frame 5, and the first mount block 8 and the camera mounting frame 5 are liquid-tightly sealed.

A seal ring 12 is interposed between the first lens unit 9 and the first mount block 8, and the first lens unit 9 is liquid-tightly supported. Furthermore, the first lens unit 9 itself has a liquid-tight structure.

A first circuit board 13 is disposed to an inner surface of the first mount block 8, and the first image pickup element 10 is mounted on the first circuit board 13. Moreover, a ground layer is formed on a front-side surface (that is a surface which is in contact with the first mount block 8) of the first circuit board 13, and the first circuit board 13 is in contact with the first mount block 8 through the ground layer.

The vertical camera unit 7 comprises a second mount block 14, a second lens unit 15 inserted into the second mount block 14 from above, and a second image pickup element 16 (see FIG. 3) arranged at a focal position of the second lens unit 15, and the second mount block 14 is made of a metal material with good heat transfer properties, e.g., the aluminum or the copper or the like.

Additionally, the second mount block 14 has a nearly discoid shape, and has a block portion 14*a* extending in up-and-down direction through the central part and a circular flange portion 14*b* formed concentrically with the block portion 14*a*. Triangular heat radiation fins 21 are formed on an upper surface of the flange portion 14*b* at a predetermined angular pitch with the block portion 14*a* as the center and the heat radiation fins 21 extend radiantly from the block portion 14*a*.

A seal ring 17 is provided between the second mount block 14 and the second lens unit 15, and the second lens unit 15 and the second mount block 14 are liquid-tightly sealed. It is to be noted that the second lens unit 15 itself has a liquid-tight structure.

The second mount block 14 is disposed in an upper end of the camera mounting frame 5 in such a manner that the second mount block 14 covers an opening of the upper end, the upper end of the camera mounting frame 5 and the flange portion 14*b* are closely fitted to each other through a metal contact, and the flange portion 14*b* is fixed to the camera mounting frame 5 by the securing means such as a bolt or the like. A seal ring 18 is provided between the upper end of the camera mounting frame 5 and the flange portion 14*b*, and the camera mounting frame 5 and the second mount block 14 are liquid-tightly sealed.

A second circuit board 19 is disposed to a lower surface of the second mount block 14, and the second image pickup element 16 is mounted on the second circuit board 19. Further, a ground layer is formed on an upper surface (that is a surface which is in contact with the second mount block 14) of the second circuit board 19, and the second circuit board 19 is in contact with the second mount block 14 through the ground layer.

A flange 22 is formed at a lower end of the camera mounting frame 5, the image processing unit 3 is disposed to a lower surface of the flange 22, a seal ring 23 is interposed between the image processing unit 3 and the flange 22, and the image processing unit 3 and the camera mounting frame 5 are liquid-tightly sealed.

The image processing unit 3 has a bottom case 24 and a circuit board 25 accommodated in the bottom case 24, and an image processing integrated circuit 26 is mounted on a back surface of the circuit board 25. A heat transfer portion 27 is provided to protrude at a position of the bottom case 24 where the heat transfer portion 27 faces the image processing integrated circuit 26, and the heat transfer portion 27 is in contact with the image processing integrated circuit 26 through a heat transfer member 28. As the heat transfer member 28, for example, the thermally-conductive sponge, e.g., insulative silicon rubber or the like is used.

The bottom case 24 and the heat transfer portion 27 are preferably integrally molded, and the bottom case 24 is made of a metal material with good heat transfer properties, e.g., the aluminum or the copper. The heat transfer member 28 and the heat transfer portion 27 function as a heat transfer path through which a heat generated by the circuit board 25 is transmitted to the bottom case 24.

The camera assembly 2 constitutes a liquid-tight structure by the camera mounting frame 5, the horizontal camera units 6 mounted on the camera mounting frame 5, the vertical camera unit 7, and the image processing unit 3. Furthermore, the camera mounting frame 5, the first mount block 8, the second mount block 14, and the bottom case 24 are made of metal materials with good heat transfer properties, the heat radiation fins 20 and the heat radiation fins 21 are formed, and the camera assembly 2 itself has a function as a heat radiator.

The heat shield cover 4 is provided so as to accommodate the camera assembly 2, and a lower heat insulating member 31 and an upper heat insulating member 32 are interposed between the camera assembly 2 and the heat shield cover 4. As a material for the lower heat insulating member 31 and the upper heating insulating member 32, for example, a material with the low heat transfer properties such as a polyacetal resin or the like is used.

The heat shield cover 4 is formed into an octagonal prism whose cross section is octagonal. The octagonal shape is formed by alternately arranging long sides and short sides, and the two pairs of opposite long sides and the two pairs of opposite short sides are parallel to each other, respectively.

A slit 36 is formed between each side surface including the long side (which will be referred to as a long-side surface 34 hereinafter) and each side surface including the short side (which will be referred to as a short-side surface 35 hereinafter) along a ridge line, and the long-side surface 34 and the short-side surface 35 are separated from each other by the slit 36.

The long-side surfaces 34 face the horizontal camera units 6, and a lens hole 37 is formed in the long-side surface 34 concentrically with an optical axis of the horizontal camera unit 6. A diameter of the lens hole 37 is larger than a diameter of an end portion of the first lens unit 9, and a gap is formed around the first lens unit 9.

Moreover, a lens hood 38 is mounted on long-side surface 34 concentrically with the lens hole 37. The lens hood 38 has a rectangular outer shape and a hole formed at the center of the lens hood 38. The hole has the same or nearly the same diameter as a diameter of the lens hole 37. A surface of the lens hood 38 is formed of a curved surface which does not intercept a field angle of the horizontal camera unit 6, and a maximum height (a height from the long-side surface 34) of the surface of the lens hood 38 is higher than a height of a maximum protruding portion of the first lens unit 9.

The lens hole 37 is likewise formed in a ceiling surface of the heat shield cover 4 concentrically with an optical axis of the second lens unit 15, and the lens hood 38 is mounted on the ceiling concentrically with the lens hole 37.

Since the lens hoods 38 are provided, when the omnidirectional camera 1 falls, the lens hoods 38 protect the first lens unit 9 and the second lens unit 15 and prevent a damage and a breakage of the lens.

The lower heat insulating member 31 is constituted of four member pieces 31*a* in protrusion shape and fixing member pieces 31*b* with arc shape attached so as to link with the adjacent member pieces 31*a*. The member pieces 31*a* are fixed to the lower portion of the camera mounting frame 5 by screws in a state that the member pieces 31*a* are put on the flange 22, and the fixing member pieces 31*b* are fixed to the member pieces 31*a* by screws so as to sandwich lower ends of the short-side surfaces 35 between the fixing member pieces 31*b* and the end surfaces of the member pieces 31*a*.

Additionally, the upper heat insulating member 32 has a ring shape with a hole 41 into which the second mount block 14 can be inserted, an outer shape of the upper heat insulating member 32 is a regular octagon, and convex portions 43 are formed on an upper surface every other side. The upper heat insulating member 32 is installed on the upper surface of the second mount block 14.

In a state that the member pieces 31a are installed on the camera mounting frame 5 and the upper heat insulating member 32 is installed on the second mount block 14, the heat shield cover 4 is put on the camera assembly 2 from above the second mount block 14 in such manner that the camera assembly 2 is accommodated in the heat shield cover 4. The heat shield cover 4 is secured to the convex portions 43 by screws piercing through the ceiling surface of the heat shield cover 4. Furthermore, the fixing member pieces 31b are fixed.

Figure 4:
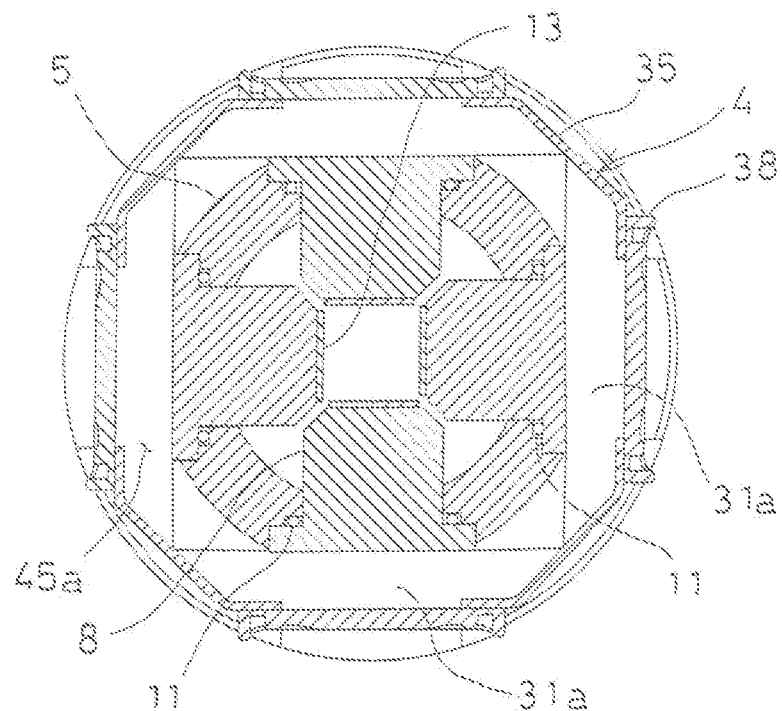
FIG. 4 is an arrow diagram A of FIG. 3.
Figure 5:
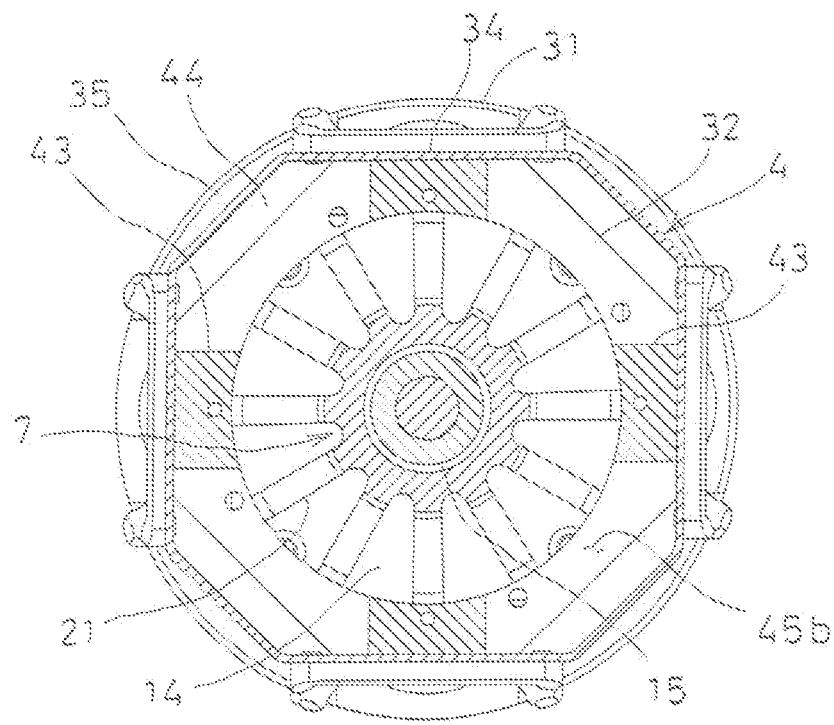
FIG. 5 is an arrow diagram B of FIG. 3.

FIG. 4 and FIG. 5 show a relationship between the lower heat insulating member 31 and the upper heat insulating member 32 in a state that the heat shield cover 4 is put on. A lower end of the heat shield cover 4 is nearly hermetically closed by the lower heat insulating member 31. The upper heating insulating member 32 is in contact with the long-side surfaces 34 every other side and is apart from the short-side surfaces 35 every other adjacent side, and a gap 44 is formed between each short-side surface 35 and the upper heat insulating member 32.

Therefore, the camera mounting frame 5 is held at the center of the heat shield cover 4 by the lower heat insulating member 31 and the upper heat insulating member 32, and a space 45 for heat radiation is formed around the camera mounting frame 5. Additionally, a space 45a formed between the lower heat insulating member 31 and the upper heat insulating member 32 communicates with a space 45b formed above the upper heating insulating member 32 through the gap 44. Further, since the lower heat insulating member 31 and the upper heat insulating member 32 are interposed between the camera assembly 2 and the heat shield cover 4, the camera assembly 2 and the heat shield cover 4 are thermally insulated from each other.

Next, a cooling function of the omnidirectional camera 1 will now be described.

Typical heat generating members in the omnidirectional camera 1 are the first image pickup element 10, the second image pickup element 16 and the image processing integrated circuit 26.

Heat generated from the first image pickup element 10 is transferred from the ground layer of the first circuit board 13 to the block portion 8a and further transmitted to the camera mounting frame 5 through the flange portion 8b. The first mount block 8 and the camera mounting frame 5 serve as heat radiators, and the heat is radiated into the space 45a from the surface of the flange portion 8b and the surface of the camera mounting frame 5. Furthermore, since the heat radiation fins 20 are formed on the surface of the camera mounting frame 5, the heat is effectively radiated.

Additionally, the heat generated from the second image pickup element 16 is transferred from the ground layer of the second circuit board 19 to the block portion 14a. The heat transferred to the block portion 14a is radiated effectively into the space 45b from the surface of the flange portion 14b and the heat radiation fins 21. Further, a part of the heat is transferred to the camera mounting frame 5 through the flange portion 14b, and the heat is also radiated from the surface of the camera mounting frame 5.

One or both of the heat radiation fins 20 and the radiation fins 21 may be omitted in accordance with a heat radiation state.

The camera assembly 2 has the liquid-tight structure and accommodates the first image pickup element 10 and the second image pickup element 16, which are heating elements, inside, and the heat generated from the first image pickup element 10 and the second image pickup element 16 is efficiently transferred to the camera mounting frame 5, the first mount block 8, and the second mount block 14 through the ground layer and radiated from the surfaces of the camera mounting frame 5, the first mount block 8, and the second mount block 14. Therefore, the camera assembly 2 can be regarded as a heating element as a whole.

The space 45a communicates with the outside of the heat shield cover 4 through the slits 36 and the lens holes 37. Furthermore, the space 45b communicates with the outside through the upper portions of the slits 36 and the periphery of the second lens unit 15. Moreover, the space 45a and the space 45b communicate with each other in up-and-down direction through the gap 44.

Therefore, the airs in the space 45a and the space 45b adjacent to the camera assembly 2 are warmed by the camera assembly 2, the warmed airs flow up without blocking the convection, and an outside air is sucked through the slits 36 and the gap around the first lens unit 9, and the heat from the camera mounting frame 5, the first mount block 8, and the second mount block 14 is effectively discharged to the outside.

As described above, since the camera assembly 2 has the liquid-tight structure, outdoor use is possible under the bad weather, e.g., the rainy weather and others even though the slits 36 are formed in the heat shield cover 4 and the inside and the outside of the heat shield cover 4 can communicate with each other.

Next, the generation of heat by the image processing integrated circuit 26 will now be described.

The heat generated by the image processing integrated circuit 26 is transferred to the bottom case 24 through the heat transfer member 28 and the heat transfer portion 27, and the heat is radiated from the surface of the bottom case 24.

Although the description has been given as to the cooling function of the omnidirectional camera 1 in case where the omnidirectional camera 1 is in a standstill state, the omnidirectional camera 1 is mounted in a mobile object in order to acquire images. For example, the omnidirectional camera 1 is installed on a ceiling of an automobile and acquires an omnidirectional image while moving.

The cooling function during moving of the omnidirectional camera 1 will now be described with reference to FIG. 6.

Figure 6:
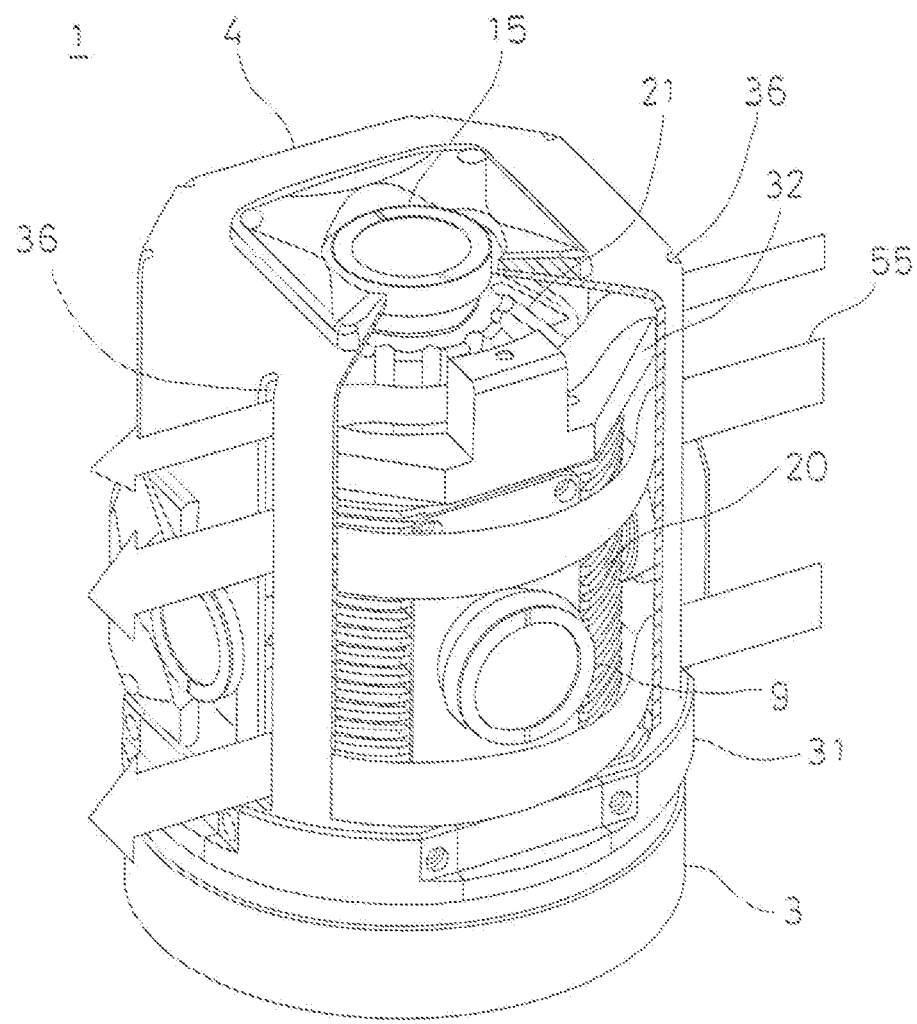
FIG. 6 is an explanatory view showing a cooling function during moving or in a state that the wind blows and FIG. 6 is also a partially cutaway perspective view of a heat shield cover.

FIG. 6 shows a state that the omnidirectional camera 1 is moving to the right side in the drawing. When the omnidirectional camera 1 moves, a wind 55 flows into an inside of the heat shield cover 4 from the slits 36 on the windward and flows out through the slits 36 on the leeward. Therefore, the cooling effect is remarkably improved.

It is to be noted that the cooling effect can be obtained similarly in a state that the wind is blowing, if the omnidirectional camera 1 is at a standstill.

The description will now be given as to a case that the omnidirectional camera 1 is used under high temperature and under the direct sunlight.

When the omnidirectional camera 1 is irradiated with the direct sunlight, the temperature of an irradiated portion becomes considerably high due to the solar heat.

In case of the omnidirectional camera 1, the heat shield cover 4 is irradiated with the direct sunlight and the temperature of the heat shield cover 4 becomes high. On the other hand, the camera assembly 2 is accommodated in the heat shield cover 4, and the head shield cover 4 blocks the direct sunlight. Further, the camera assembly 2 is thermally insulated from the heat shield cover 4 by the lower heat insulating member 31 and the upper heat insulating member 32. Therefore, there is no case where the camera assembly 2 is heated by a heat conduction from the heat shield cover 4.

Further, since the space 45 is formed around the camera assembly 2 and the space 45 communicates with the outside through the slits 36 and the lens holes 37, the heated air is released to the outside by the convection and the heated air is not stagnated inside even if the temperature of the heat shield cover 4 becomes high and the air in the space 45 is heated by the heat shield cover 4.

Therefore, even if the omnidirectional camera 1 is used at a high temperature under the direct sunlight, the omnidirectional camera 1 normally operates.

As for a shape of the heat shield cover 4, a cross section may be circular or rectangular, and any shape can suffice if the heat shield cover 4 can accommodate the camera assembly 2. Furthermore, as for a shape of the upper heat insulating member 32, any shape can suffice if spaces above and below the upper heat insulating member 32 communicate with each other. Therefore, a concave portion may be formed around the upper heat insulating member 32, or a hole penetrating in up-and-down direction may be formed in the upper heat insulating member 32. Moreover, although the four horizontal camera units 6 are provided in the foregoing embodiment, three, five or more horizontal camera units 6 may be provided. Additionally, when an image of the upper side does not have to be acquired, the vertical camera unit 7 can be omitted.

Further, a lower end opening portion of the camera mounting frame 5 is liquid-tightly covered by the bottom case 24, but a bottom plate may be additionally provided and this lower end opening portion may be covered liquid-tightly using the bottom plate.

The invention claimed is:

1. An omnidirectional camera, comprising a camera mounting frame of a cylindrical hollow body, two or more first mount blocks which hold a first lens unit in a horizontal posture and are installed to said camera mounting frame from a horizontal direction, and first circuit boards provided on inner end surfaces of said first mount blocks,
   wherein said camera mounting frame and said first mount blocks are made of a metal material,
   wherein said first circuit board has a ground layer formed on a surface abutting said first mount block, such that the ground layer is in contact with the inner end surface of the first mount block, and said first circuit board has a first image pickup element disposed on said surface and arranged on an optical axis of said first lens unit, and
   wherein the heat generated from said first image pickup element is radiated from said first mount block and said camera mounting frame through said ground layer.

2. The omnidirectional camera according to claim 1, further comprising a second mount block which holds a second lens unit in a vertical posture and is installed so as to cover an upper end of said camera mounting frame, and a second circuit board provided on an inner end surface of said second mount block,
   wherein said second mount block is made of a metal material,
   wherein said second circuit board has a ground layer formed on a surface abutting said second mount block, such that the ground layer is in contact with the inner end surface of the second mount block, and said second circuit board has a second image pickup element disposed on said surface and arranged on an optical axis of said second lens unit, and
   wherein the heat from said second image pickup element is radiated from said second mount block and said camera mounting frame through said ground layer.

3. The omnidirectional camera according to claim 1 or 2, wherein a bottom case made of a metal material is provided at a lower end of said camera mounting frame, an image processing integrated circuit is accommodated in said bottom case, said image processing integrated circuit is in contact with said bottom case through a heat transfer member, and the heat from said image processing integrated circuit is radiated from said bottom case through said heat transfer member.

4. The omnidirectional camera according to claim 3, wherein a heat transfer portion is integrally provided to protrude from said bottom case, and said heat transfer member is provided between said heat transfer portion and said image processing integrated circuit.

5. The omnidirectional camera according to claim 3, wherein said first lens unit and said second lens unit have a liquid-tight structure, said first mount blocks, said second mount block, and said bottom case are liquid-tightly installed to said camera mounting frame, and said first mount blocks, said second mount block, and said bottom case constitute a liquid-tight structure.

6. The omnidirectional camera according to claim 2, wherein radiation fins are formed on at least one of said camera mounting frame and said second mount block.

7. The omnidirectional camera according to claim 5, wherein said liquid-tight structure is accommodated in a heat shield cover with ventilation.

8. The omnidirectional camera according to claim 7, wherein a heat insulating portion is provided between said heat shield cover and said camera mounting frame, and said heat shield cover and said camera mounting frame are thermally insulated from each other.

* * * * *